UNITED STATES PATENT OFFICE.

PAUL R. HERSHMAN, OF CHICAGO, ILLINOIS, ASSIGNOR, BY MESNE ASSIGNMENTS, TO ARMOUR FERTILIZER WORKS, OF CHICAGO, ILLINOIS, A CORPORATION OF NEW JERSEY.

PRODUCTION OF AMMONIA.

1,261,526.     Specification of Letters Patent.     Patented Apr. 2, 1918.

No Drawing.     Application filed December 22, 1914. Serial No. 878,583.

*To all whom it may concern:*

Be it known that I, PAUL R. HERSHMAN, a subject of the Emperor of Austro-Hungary, residing in the city of Chicago, county of Cook, State of Illinois, have invented certain new and useful Improvements in the Production of Ammonia; and I do hereby declare the following to be a full, clear, and exact description of the invention, such as will enable others skilled in the art to which it appertains to make and use the same.

My invention relates to the production of ammonia from aluminum nitrid, and is based upon the discovery that the aluminum nitrid may be decomposed, with the formation of ammonia and alumina by passing through or bringing in contact with the aluminum nitrid a current of superheated steam. The ammonia formed by the interaction of the aluminum nitrid and a portion of the steam is carried off by the main body portion of the steam and may be condensed with or recovered therefrom in any appropriate manner.

I have discovered further that by adding an alkaline earth metal oxid (such as calcium oxid) to the aluminum nitrid, the decomposing action of the superheated steam upon the nitrid is favored both as to completeness and duration.

In carrying out the invention, the aluminum nitrid, in such state of subdivision as will permit the ready passage of the superheated steam therethrough, may be withdrawn directly from the furnace in which it has just been produced and allowed to cool to a point slightly below the temperature at which ammonia tends to dissociate in any important amount, that is to say, between 500 and 600° C.

The calcium oxid may be added to the charge, preferably in the proportion of one part by weight of calcium oxid to nine parts by weight of aluminum nitrid. The addition is preferably made at the time that the aluminum nitrid is withdrawn hot from the furnace, and the two ingredients are then thoroughly admixed so as to obtain as homogeneous a distribution as possible of the calcium oxid throughout the mass. By the time the aluminum nitrid has fallen in temperature to the desired point, the calcium oxid will likewise be of the same temperature.

Superheated steam is then passed through the mass, and the thermal conditions are maintained as nearly constant as possible during the passage of the superheated steam for the reason that the decomposition of the aluminum nitrid and the consequent formation of the ammonia takes place to the best advantage at a point just below the dissociation temperature of ammonia.

The presence of calcium oxid, while not essential to the operation, nevertheless assists it, either because of catalytic effect or because of its function of dividing up the particles of aluminum nitrid so as to make them more accessible to the action of the superheated steam.

At the termination of the operation, the residual charge of alumina or of alumina and calcium oxid is dry, in contradistinction to those processes wherein the ammonia is produced by boiling aluminum nitrid in an alkali or the like; consequently, the residual alumina, or the residual alumina and calcium oxid may be used at once for the production of a further quantity of aluminum nitrid; or the residual charge of alumina or of alumina and calcium oxid may be used for the production of metallic aluminum therefrom.

What I claim is:

1. The method of producing ammonia, which comprises passing superheated steam through a body of aluminum nitrid maintained at a temperature approximating but lower than 600° C.; substantially as described.

2. The method of producing ammonia, which comprises passing superheated steam through aluminum nitrid admixed with calcium oxid, said mixture being maintained at a temperature approximating but lower than 600° C.; substantially as described.

3. The method of producing ammonia, which comprises permitting a charge of aluminum nitrid fresh from the heat of nitrogenization to cool to a temperature approximating but lower than 600° C., passing superheated steam through the mass, and maintaining the thermal conditions substantially constant during the passage of the superheated steam; substantially as described.

4. The method of producing ammonia, which comprises adding to a charge of aluminum nitrid fresh from the heat of nitrogenization, a quantity of calcium oxid, mixing the ingredients so as to obtain their substantial equal distribution throughout the mass, permitting the mass to cool to a temperature approximating but lower than 600° C., passing superheated steam through the mass, and maintaining the thermal conditions substantially constant during the passage of the superheated steam; substantially as described.

5. The method of producing ammonia, which comprises adding to a charge of aluminum nitrid fresh from the heat of nitrogenization, a quantity of calcium oxid, mixing the ingredients so as to obtain their substantial equal distribution throughout the mass, permitting the mass to cool to a temperature below 600° C., passing superheated steam through the mass, and maintaining the mass at a temperature high enough for the production of ammonia but lower than 600° C.; substantially as described.

6. The method of producing ammonia, which comprises passing superheated steam through a mixture of aluminum nitrid and calcium oxid maintained at a substantially constant temperature approximating 600° C.; substantially as described.

7. The method of producing ammonia, which comprises passing superheated steam through aluminum nitrid admixed with calcium oxid, said mixture being maintained at a temperature high enough for the production of ammonia, but lower than 600° C.

8. The method of producing ammonia, which comprises permitting a charge of aluminum nitrid fresh from the heat of nitrogenization and admixed with a quantity of calcium oxid to cool to a temperature approximating 600° C., passing superheated steam through the mass while maintaining the temperature substantially constant; substantially as described.

9. The method of producing ammonia, which comprises permitting a charge of aluminum nitrid fresh from the heat of nitrogenization and admixed with a quantity of calcium oxid to cool to a temperature lower than 600° C., passing superheated steam through the mass, and maintaining the mass at a temperature high enough for the production of ammonia but lower than 600° C.; substantially as described.

In testimony whereof I affix my signature, in presence of two witnesses.

PAUL R. HERSHMAN.

Witnesses:
M. AMES,
M. A. BILL.